United States Patent
Fembacher

(10) Patent No.: US 11,187,798 B2
(45) Date of Patent: Nov. 30, 2021

(54) METHOD AND SYSTEM FOR SYNTHETIC APERTURE RADAR SIGNAL PROCESSING

(71) Applicant: Infineon Technologies AG, Neubiberg (DE)

(72) Inventor: Florian Fembacher, Bruckmuehl (DE)

(73) Assignee: Infineon Technologies AG

( * ) Notice: Subject to any disclaimer, the term of this patent is extended or adjusted under 35 U.S.C. 154(b) by 300 days.

(21) Appl. No.: 16/246,933

(22) Filed: Jan. 14, 2019

(65) Prior Publication Data
US 2019/0227162 A1    Jul. 25, 2019

(30) Foreign Application Priority Data

Jan. 19, 2018  (DE) .......................... 102018101237.3
Feb. 26, 2018  (DE) .......................... 102018202864.8

(51) Int. Cl.
| | | |
|---|---|---|
| *G01S 13/90* | (2006.01) | |
| *G01S 13/53* | (2006.01) | |
| *G01S 13/931* | (2020.01) | |
| *G01S 13/12* | (2006.01) | |

(52) U.S. Cl.
CPC .......... *G01S 13/904* (2019.05); *G01S 13/12* (2013.01); *G01S 13/53* (2013.01); *G01S 13/9011* (2013.01); *G01S 13/9054* (2019.05); *G01S 13/931* (2013.01); *G01S 2013/9314* (2013.01); *G01S 2013/9315* (2020.01); *G01S 2013/9319* (2020.01)

(58) Field of Classification Search
CPC ............ G01S 13/9011; G01S 13/9017; G01S 13/9019; G01S 13/90; G01S 13/9004; G01S 13/9041; G01S 13/9043; G01S 13/9047; G01S 13/9052; G01S 13/9054; G01S 13/904; G01S 13/931
USPC .......... 342/196, 25 R, 25 D, 25 E, 25 F, 25 B
See application file for complete search history.

(56) References Cited

U.S. PATENT DOCUMENTS

| | | | | |
|---|---|---|---|---|
| 4,034,370 A | * | 7/1977 | Mims .................. | G01S 13/9011 342/25 D |
| 5,043,734 A | * | 8/1991 | Niho .................... | G01S 13/9019 342/25 A |
| 5,184,133 A | * | 2/1993 | Tsao .................... | G01S 13/9064 342/25 F |
| 5,237,329 A | * | 8/1993 | Barnier ............... | G01S 13/9011 342/25 A |

(Continued)

OTHER PUBLICATIONS

Lawrence M. Leibowitz "Overview of Digital Signal Processing Theory" Naval Research Laboratory, May 20, 1975. (Year: 1975).*

(Continued)

*Primary Examiner* — Erin F Heard
*Assistant Examiner* — Michael W Justice
(74) *Attorney, Agent, or Firm* — Design IP

(57) ABSTRACT

A method for synthetic aperture radar signal processing includes storing signal responses of a radar signal in a memory buffer, wherein the stored signal responses are represented by a two-dimensional signal in an azimuth dimension and a range dimension. The method further includes frequency filtering the two-dimensional signal in the azimuth dimension. In addition, the method includes applying a Fourier transformation to the frequency filtered signal in the range dimension. The method further includes generating a synthetic aperture radar image based on the Fourier transformed frequency filtered signal.

20 Claims, 3 Drawing Sheets

(56) References Cited

U.S. PATENT DOCUMENTS

| | | | | |
|---|---|---|---|---|
| 5,245,347 | A * | 9/1993 | Bonta | G01S 7/2813 |
| | | | | 342/149 |
| 5,608,404 | A * | 3/1997 | Burns | G01S 13/9011 |
| | | | | 342/25 A |
| 6,828,929 | B2 * | 12/2004 | Barbella | G01S 13/53 |
| | | | | 342/109 |
| 7,663,529 | B2 * | 2/2010 | Connell | G01S 13/9011 |
| | | | | 342/25 F |
| 7,843,377 | B2 * | 11/2010 | Connell | G01S 13/9019 |
| | | | | 342/25 F |
| 8,009,079 | B2 * | 8/2011 | Connell | G01S 13/9019 |
| | | | | 342/25 F |
| 8,044,846 | B1 * | 10/2011 | Urkowitz | G01S 13/582 |
| | | | | 342/179 |
| 8,576,111 | B2 * | 11/2013 | Smith | G01S 7/4026 |
| | | | | 342/25 F |
| 2004/0150552 | A1 * | 8/2004 | Barbella | G01S 13/24 |
| | | | | 342/109 |
| 2005/0073455 | A1 * | 4/2005 | Chow | G01S 7/295 |
| | | | | 342/25 F |
| 2008/0042893 | A1 * | 2/2008 | Connell | G01S 13/9019 |
| | | | | 342/25 F |
| 2010/0149024 | A1 * | 6/2010 | Connell | G01S 13/9019 |
| | | | | 342/25 F |
| 2010/0214160 | A1 * | 8/2010 | Smith | G01S 7/4026 |
| | | | | 342/25 F |
| 2011/0133983 | A1 * | 6/2011 | Connell | G01S 13/9019 |
| | | | | 342/25 F |
| 2019/0120931 | A1 * | 4/2019 | Mihajlovic | H01Q 21/062 |

OTHER PUBLICATIONS

Michael Cerna and Audrey F. Harvey "The Fundamentals of FFT-Based Signal analysis and Measurement" National Instruments Copyright Jul. 2000 (Year: 2000).*

Yi Sun, et al., "The Subaperture Secondary Range Compression Algorithm for Near Space Squint SAR". IEEE International Symposium on Signal Processing and Information Technology, Athens, Greece, Dec. 2013, pp. 338-343.

James Mure-Dubois, et al., "Sonar and Radar SAR Processing for Parking Lot Detection". 12th International Radar Symposium (IRS), Leipzig, Germany, Sep. 2011, pp. 1-6.

George W. Stimson, "SAR Design Considerations". Introduction to Airborne Radar 2nd Edition, Jan. 1998, Part VII, Chapter 32.

* cited by examiner

METHOD AND SYSTEM FOR SYNTHETIC APERTURE RADAR SIGNAL PROCESSING

FIELD

The present disclosure relates to automotive radar systems. In particular, the present disclosure relates to methods and automotive embedded systems for synthetic aperture radar signal processing.

BACKGROUND

Automotive radar systems may be used for blind spot detection, automated cruise control, collision avoidance systems, etc. Automotive embedded systems only offer low computational performance and limited memory. It may thus be important to find a good tradeoff between an obtained imaging quality and computational requirements of a radar imaging algorithm. Manufacturers of automotive radar systems and components thereof are constantly striving to improve their products. It may thus be desirable to provide automotive radar systems with improved computational requirements.

SUMMARY

An aspect of the present disclosure relates to a method for synthetic aperture radar signal processing. The method includes storing signal responses of a radar signal in a memory buffer, wherein the stored signal responses are represented by a two-dimensional signal in an azimuth dimension and a range dimension. The method further includes frequency filtering the two-dimensional signal in the azimuth dimension. The method further includes applying a Fourier transformation to the frequency filtered signal in the range dimension. The method further includes generating a synthetic aperture radar image based on the Fourier transformed frequency filtered signal.

A computational effort for synthetic aperture radar signal processing in accordance with the present disclosure may thus be substantially reduced to a frequency filtering in the azimuth dimension and a Fourier transformation in the range dimension. Other methods for providing synthetic aperture radar images may include convolving signal responses of a radar signal with a range reference function to obtain range compressed data. The range compressed data may be convolved with an azimuth reference function to obtain image data. Compared to such other methods, the methods in accordance with the disclosure may require less local memory for a calculation of synthetic aperture radar images. In addition, the methods in accordance with the disclosure may require lower computational resources for a signal processing in real-time.

According to an embodiment the frequency filtering includes attenuating Doppler frequencies lying outside of a frequency range, wherein the frequency range includes a predetermined Doppler frequency. By attenuating the Doppler frequencies lying outside of such frequency range, curved range profiles of point targets resulting from a relative movement between a radar system and a target may be focused. In addition, by attenuating said Doppler frequencies a range cell migration problem may be solved implicitly such that a further act of performing a range cell migration correction may become obsolete. In other words, a curved range profile may be refocused without explicitly performing a range cell migration correction.

According to an embodiment the frequency filtering includes convolving the two-dimensional signal with a bandpass filter function in the time domain. The convolution of the two-dimensional signal with a bandpass filter function in the time domain may result in the attenuation of the Doppler frequencies lying outside of the frequency range including the predetermined Doppler frequency.

According to an embodiment the frequency filtering includes multiplying the two-dimensional signal with a bandpass filter function in the frequency domain. Such multiplication may be performed as an alternative to the convolution of the two-dimensional signal with a bandpass filter function in the time domain. In a similar fashion, the multiplication in the frequency domain may result in the attenuation of the Doppler frequencies lying outside of the frequency range including the predetermined Doppler frequency.

According to an embodiment the frequency filtering includes an act of applying a Fourier transformation from the time domain into the frequency domain. In a further act, Doppler frequencies lying outside of a frequency range are cut off, wherein the frequency range includes a predetermined Doppler frequency. In a further act, an inverse Fourier transformation from the frequency domain into the time domain is applied.

According to an embodiment the frequency filtering includes a range cell migration correction. For example, a range cell migration may be observed through curved range profiles of point targets. A correction of the curved range profiles according to the synthetic aperture radar signal processing presented herein may result in an implicit range cell migration correction as previously described.

According to an embodiment the synthetic aperture radar image is based on an absolute value of the Fourier transformed frequency filtered signal. A synthetic aperture radar image may be displayed in terms of intensity values such that each image pixel may give an indication of a reflectivity of a corresponding point of the illuminated scene. Real valued intensities may be obtained based on the absolute value of the complex valued Fourier transformed frequency filtered signal.

According to an embodiment generating the synthetic aperture radar image includes an act of generating multiple partial synthetic aperture radar images, wherein each of the partial synthetic aperture radar images is based on about 1% to about 10% of all azimuth samples recorded for generating the synthetic aperture radar image. The number of all azimuth samples may depend on the recorded scenario. In a further act, the synthetic aperture radar image is generated based on the multiple partial synthetic aperture radar images. In other words, it may be possible to first process smaller radar images and to merge these smaller radar images to a larger overall radar image later on. Measurement results may thus be provided in a timely manner and real-time signal processing may become possible. In addition, less local memory may be required for the calculation of the synthetic aperture radar image. In comparison, other solutions providing synthetic aperture radar images may require higher computational resources for a signal processing in real-time. In addition, according to such other solutions a complete synthetic aperture radar image may only be generated after a complete scene has been recorded.

According to an embodiment the method further includes correcting a scaling of the synthetic aperture radar image based on an acceleration profile. If a radar system moves at a non-constant velocity, occurring accelerations of the radar system may need to be compensated in synthetic aperture radar signal processing. The compensation may avoid an incorrect scaling of a calculated synthetic aperture radar image. For this purpose, an acceleration profile of the moving radar system may be recorded such that a scaling of the synthetic aperture radar image may be corrected based on the recorded acceleration profile.

According to an embodiment the method further includes controlling a pulse repetition interval of the radar signal based on results of an acceleration measurement. The pulse repetition interval may be controlled in order to compensate occurring accelerations of the radar system. In particular, an acceleration of the moving radar system may be measured in real-time such that the pulse repetition interval may be based on the measured real-time acceleration value. The pulse repetition interval may remain constant during time intervals of constant velocities. The pulse repetition interval may be adjusted if accelerations of the radar system are detected.

A further aspect of the present disclosure relates to an automotive embedded system for synthetic aperture radar signal processing. The system includes a memory buffer configured to store signal responses of a radar signal, wherein the stored signal responses are represented by a two-dimensional signal in an azimuth dimension and a range dimension. The system further includes a digital frequency filter configured to filter the two-dimensional signal in the azimuth dimension. The system further includes a Fourier unit configured to apply a Fourier transformation to the frequency filtered signal in the range dimension. The system further includes an image generating unit configured to generate a synthetic aperture radar image based on the Fourier transformed frequency filtered signal.

According to an embodiment the digital frequency filter is a bandpass filter configured to convolve the two-dimensional signal with a bandpass filter function in the time domain.

According to an embodiment the digital frequency filter is a bandpass filter configured to multiply the two-dimensional signal with a bandpass filter function in the frequency domain.

According to an embodiment the digital frequency filter is a Butterworth filter. In further embodiments the digital frequency filter may also be a different suitable digital filter with a similar passband. For example, the digital frequency filter may also be a Chebyshev filter, an elliptic filter, etc.

According to an embodiment the digital frequency filter is implemented in hardware. An implementation in hardware may be simple and cost-effective. An implementation in hardware may be particularly suitable for an embedded system. Alternatively, the digital frequency filter may be implemented in software. The software may run on a central processing unit (CPU) or a graphics processing unit (GPU).

According to an embodiment each of the digital frequency filter and the Fourier unit are implemented as a field-programmable gate array (FPGA) or an application-specific integrated circuit (ASIC).

According to an embodiment the system is configured to operate in a 24 GHz, 77 GHz or 79 GHz frequency band. In particular, automotive radar sensors may operate in these millimeter wave frequency bands.

A further aspect of the present disclosure relates to a parking assist system which is configured to perform a method in accordance with the disclosure. Parking assist systems may utilize a network of external cameras and radar sensors to monitor the surrounding environment of a vehicle.

A further aspect of the present disclosure relates to a frequency modulated continuous wave synthetic aperture radar system arranged at a long side of a car and configured to perform a method in accordance with the disclosure. For example, synthetic aperture radar images generated by the radar system may be used for detecting a free parking space located between parked vehicles.

A further aspect of the present disclosure relates to a sensor fusion system configured to use a synthetic aperture radar image as an input, wherein the synthetic aperture radar image is generated based on a method in accordance with the disclosure. The generated synthetic aperture radar image may thus be used when combining sensory data derived from various sensor sources.

A further aspect of the present disclosure relates to an apparatus for synthetic aperture radar signal processing. The apparatus includes means for storing signal responses of a radar signal in a memory buffer, wherein the stored signal responses are represented by a two-dimensional signal in an azimuth dimension and a range dimension. The apparatus further includes means for frequency filtering the two-dimensional signal in the azimuth dimension. The apparatus further includes means for applying a Fourier transformation to the frequency filtered signal in the range dimension. The apparatus further includes means for generating a synthetic aperture radar image based on the Fourier transformed frequency filtered signal.

According to an embodiment the means for frequency filtering include means for attenuating Doppler frequencies lying outside of a frequency range, wherein the frequency range includes a predetermined Doppler frequency.

According to an embodiment the means for frequency filtering include means for convolving the two-dimensional signal with a bandpass filter function in the time domain.

According to an embodiment the means for frequency filtering include means for multiplying the two-dimensional signal with a bandpass filter function in the frequency domain.

According to an embodiment the means for frequency filtering include means for applying a Fourier transformation from the time domain into the frequency domain. The means for frequency filtering further include means for cutting off Doppler frequencies lying outside of a frequency range, wherein the frequency range includes a predetermined Doppler frequency. The means for frequency filtering further include means for applying an inverse Fourier transformation from the frequency domain into the time domain.

According to an embodiment the means for generating the synthetic aperture radar image include means for generating multiple partial synthetic aperture radar images, wherein each of the partial synthetic aperture radar images is based on about 1% to about 10% of all azimuth samples recorded for generating the synthetic aperture radar image. The means for generating the synthetic aperture radar image further include means for generating the synthetic aperture radar image based on the multiple partial synthetic aperture radar images.

According to an embodiment the apparatus for synthetic aperture radar signal processing includes means for controlling a pulse repetition interval of the radar signal based on results of an acceleration measurement.

According to an embodiment the apparatus for synthetic aperture radar signal processing includes means for correcting a scaling of the synthetic aperture radar image based on an acceleration profile.

DETAILED DESCRIPTION

Figure 1:
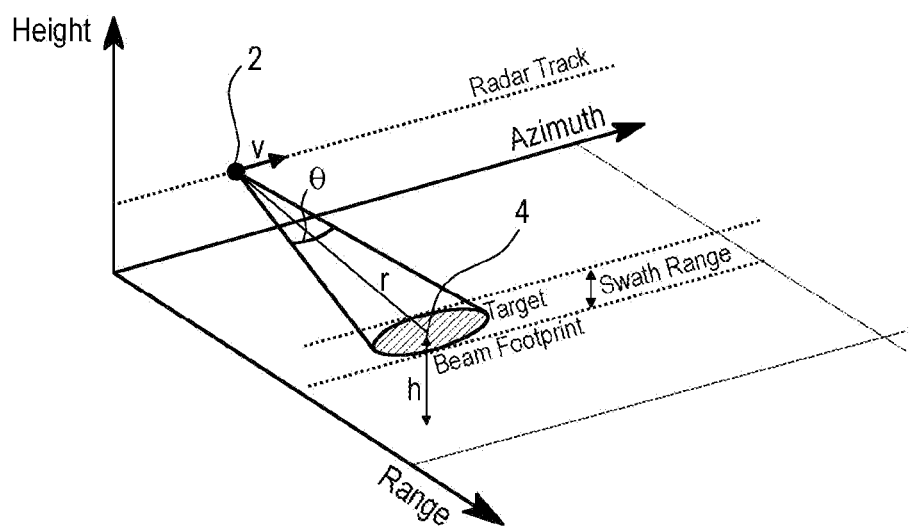
FIG. 1 schematically illustrates an example of a synthetic aperture radar imaging geometry.

FIG. 1 schematically illustrates an example of a synthetic aperture radar imaging geometry. The geometry is shown for a three-dimensional coordinate system with a range dimension, an azimuth dimension and a height dimension. A radar system (or radar platform) 2 moves along a radar track in the azimuth direction. For the sake of simplicity it is assumed that the radar system 2 is moving on a straight line with a constant velocity vector v. The radar system 2 transmits a radar beam having a beam width θ and receives echoes from a target 4. The swath range of the beam footprint corresponds to the range extent of the beam footprint. The overall azimuth extent of the beam footprint depends on the duration of data taking, i.e., on how long the radar system 2 is turned on.

In the example of FIG. 1, the radar system 2 and the target 4 are illustrated to be arranged at a same height h. A distance r between the radar system 2 moving at constant velocity v and the target 4 may be expressed as $$r(t) = \sqrt{r_0 + v^2 t} \quad (1)$$

where $r_0$ is the range at closest approach. The time t in equation (1) is associated with the movement of the radar system 2 in the azimuth direction and may be denoted as slow time $t_s$. A time in the range direction may be denoted as fast time $t_f$ which is an allusion to the velocity of electromagnetic waves travelling at the speed of light.

Figure 2:
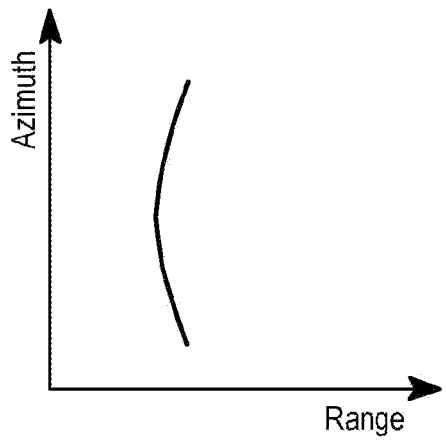
FIG. 2 schematically illustrates a range profile of a point target in a range-azimuth coordinate system.

FIG. 2 schematically illustrates a range profile of the point target 4 in a range-azimuth coordinate system. The radar system 2 may transmit frequency modulated continuous wave (FMCW) signals at a given pulse repetition frequency (PRF) and may receive echoed signals from targets. Multiple echoes over time may be collected and stored in a memory buffer. The target 4 will be measured multiple times during the movement of the radar system 2 and may thus appear at different slant ranges in the stored signal. Due to the movement of the radar system 2, a point target will not appear as a point, but will show a curved range profile as e.g. shown in FIG. 2. The range profile of a point target may be modeled by equation (1). Furthermore, due to a change of distance between the radar system 2 and the target 4, a Doppler frequency is sampled in the azimuth direction. A correction of the curved range profile in synthetic aperture radar signal processing may be referred to as range cell migration.

Figure 3:
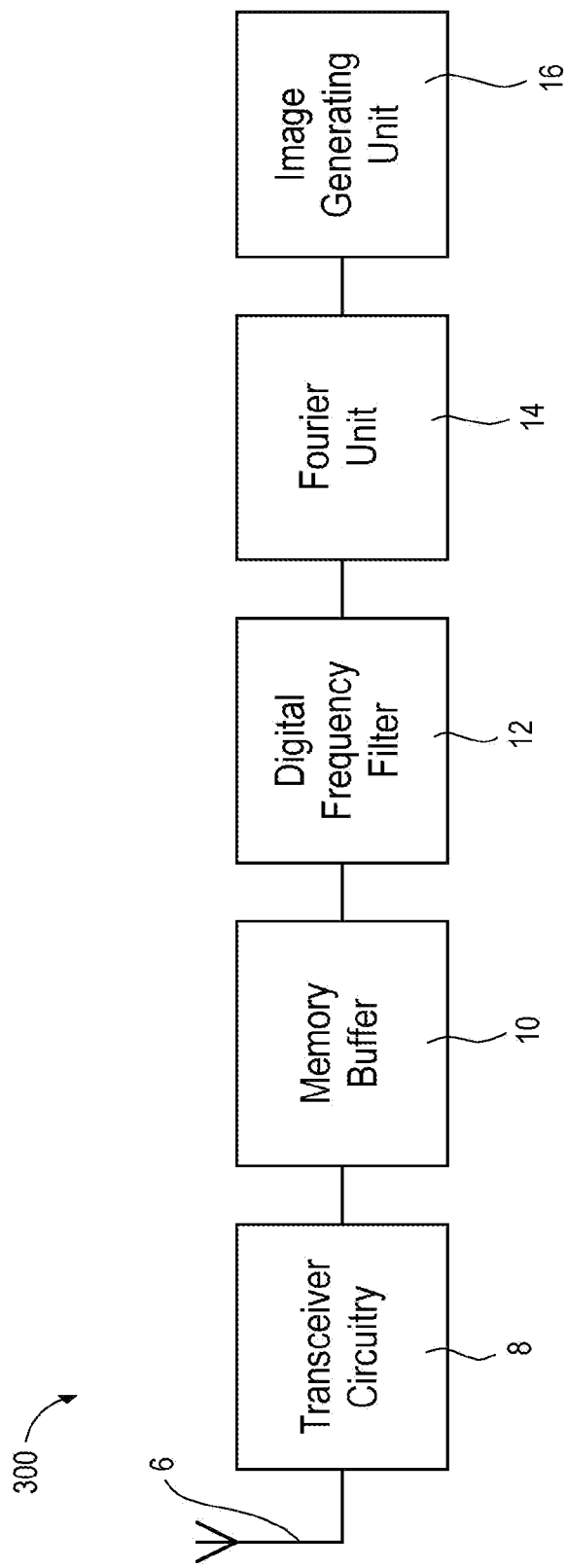
FIG. 3 schematically illustrates an automotive embedded system 300 for synthetic aperture radar signal processing.

FIG. 3 schematically illustrates an automotive embedded system 300 for synthetic aperture radar signal processing. The system 300 may include one or more transmit and receipt antennas 6, transceiver circuitry 8, a memory buffer 10, a digital frequency filter 12, a Fourier unit 14 and an image generating unit 16. The units of the system 300 may be connected in series.

The system 300 may be a part of a radar system as e.g. described in connection with FIG. 1. During an operation of the system 300 a transmitter section of the transceiver circuitry 8 may generate radar signals which may be transmitted via antenna 6. For example, the system 300 may be an FMCW radar system which may be operated in a 24 GHz, 77 GHz or 79 GHz frequency band. In particular, a FMCW radar system may transmit a chirp signal which may be expressed as $$s_t(t_f) = \exp(j2\pi(f_c t_f + \tfrac{1}{2}\alpha t_f^2)) \quad (2)$$

where j denotes the imaginary unit, $f_c$ denotes the carrier frequency, $t_f$ denotes the fast time variable within the pulse repetition interval (PRI) and α denotes the frequency sweep rate. The frequency sweep rate α may be expressed as $$\alpha = \frac{B}{PRI} \quad (3)$$

where B denotes the bandwidth of the radar and PRI denotes the pulse repetition interval.

The system 300 may receive echo signals via antenna 6. The received signal may be mixed with the transmitted signal resulting in an intermediate frequency (IF) signal which may be approximated by $$s_{IF} \approx \exp(j2\pi(f_c \tau + f_b t_f + f_D t_s)) \quad (4a)$$

where τ denotes the round trip delay time, $f_b$ denotes the beat frequency, $f_D$ denotes the Doppler frequency in one chirp and $t_s$ denotes the slow time variable in one chirp. The beat frequency $f_b$ may correspond to a frequency difference between the frequency of the transmitted signal and the delayed echo signal. The beat frequency $f_b$ may thus represent a measure of the distance of the reflecting object. In a more accurate signal model the IF signal may be approximated by $$s_{IF} \approx A_{IF} \exp\left(j2\pi\left(\left(\alpha\tau_0 + \frac{f_c 2v}{c}\right)t_f + f_c\tau_0\right)\right) = \\ A_{IF}\exp(j2\pi(f_b + f_D)t_f + f_c\tau_0) \quad (4b)$$

where $A_{IF}$ denotes the amplitude of the IF signal, $\tau_0$ denotes the round trip delay time at the beginning of the chirp signal, c denotes the speed of light and v denotes the constant radial velocity of a moving target. The signal model according to equation (4b) refers to one chirp signal. The last term in equation (4b) corresponds to a phase including Doppler information in the azimuth dimension. Note that the round trip delay time may change because the radar system may move during one chirp. Accordingly, the phase including Doppler information in the azimuth dimension (last term in equation (4b)) may change for each chirp as well.

The IF signal may represent the signal responses of the transmitted radar signal and may be stored in the memory buffer 10. Before storing the IF signal, it may be processed in further acts which are not explicitly discussed herein for the sake of simplicity. For example, the IF signal may be digitized by an A/D-converter (not shown) which may be included in a receiver section of the transceiver circuitry 8. In addition, the IF signal may be amplified by an amplifier (not shown) which may also be included in the receiver section of the transceiver circuitry 8.

The stored IF signal may be represented by a two-dimensional signal in the azimuth dimension and the range dimension. Thus, the stored received echo signal data may form a two-dimensional data matrix of complex samples.

Each of the complex samples is given by its real and imaginary part, thus representing an amplitude and phase value. The first dimension of the stored two-dimensional signal corresponds to the fast time, i.e., the range direction. The system 300 may acquire a range line whenever it travels a distance v·PRI such that a second dimension of the data matrix may be formed which corresponds to the slow time, i.e., the azimuth direction. The return echoes from the scene illuminated by the system 300 are thus sampled both in fast time and slow time.

The stored two-dimensional IF signal may be read from the memory buffer 10 and may be processed by the digital frequency filter 12. In particular, the digital frequency filter 12 may perform a frequency filtering of the two-dimensional signal in the azimuth dimension. In one example, the frequency filtering may include convolving the two-dimensional IF signal $s_{IF}$ with a bandpass filter function h in the time domain. The filter function h may be expressed as $$h = 2B \sin c(2\pi Bt) \quad (5)$$

where B denotes the filter bandwidth. The filtered signal may be expressed as $$s_{filtered} = s_{IF}(t_f) * h \quad (6)$$

where "*" denotes the convolution operator. For example, the bandpass filter may be a Butterworth filter performing a lowpass frequency filtering.

As explained in connection with FIG. 1, due to the movement of the radar system 2, a point target may appear as a curved range profile and a Doppler frequency may be sampled in the azimuth direction. In order to refocus the curved range profile of a point target to a point, Doppler frequencies lying outside of a predetermined frequency range may need to be filtered out. The predetermined frequency range particularly includes a predetermined Doppler frequency which may correspond to the range at closest approach. The predetermined Doppler frequency may depend on the relative motion between the radar system and the observed target. In particular, the predetermined Doppler frequency may depend on the velocity vector of the radar system and the angle under which the target is observed. For the case of a radar system moving with a constant velocity vector and transmitting radar signals in a direction perpendicular to the velocity vector, the predetermined Doppler frequency may correspond to the zero Doppler frequency.

The frequency filtering performed by the digital frequency filter 12 may result in an attenuation of the Doppler frequencies lying outside of the predetermined frequency range including the predetermined Doppler frequency. That is, the frequency filtering may result in a correction of the range profile (see FIG. 2). Consequently, the digital frequency filtering may include a range cell migration correction. A bandwidth of the digital frequency filter 12 may be chosen as close as possible to zero. For the case of the predetermined Doppler frequency corresponding to the zero Doppler frequency, a cutoff frequency of a used lowpass filter may lie in a range from about 4 Hz to about 10 Hz. A specific value for the cutoff frequency of the lowpass filter may be 7 Hz.

In a further example, convolving the two-dimensional IF signal with a bandpass filter function in the time domain may be replaced by multiplying the two-dimensional IF signal with a bandpass filter function in the frequency domain. In this case, the IF signal may be Fourier transformed from the time domain into the frequency domain. In the frequency domain, Doppler frequencies lying outside of the frequency range including the predetermined Doppler frequency may be cutoff. The filtered signal may then be inversely Fourier transformed from the frequency domain into the time domain. In this case, the system 300 may further include a Fourier unit (not illustrated) and an inverse Fourier unit (not illustrated) configured to perform the Fourier transformation and the inverse Fourier transformation, respectively. Performing the Fourier transformations, in particular Fast Fourier transformations, may include applying a window function to improve the quality of the signal. Similar to the frequency filtering in the time domain, the frequency filtering in the frequency domain may include attenuating Doppler frequencies lying outside of the frequency range including the predetermined Doppler frequency.

The frequency filtered signal may still include encoded range information, i.e. information about a relative distance between the radar system and the illuminated scene. This information may be decoded by processing the filtered signal by means of the Fourier unit 14. In particular, the Fourier unit 14 may apply a Fourier transformation to the frequency filtered signal in the range dimension. Note that the terms "Fourier transformation" and "Fast Fourier transformation" may be interchangeably used herein. The applied Fourier transformation may be expressed as a discrete Fourier transformation $$Img(k) = \sum_{n=0}^{N-1} s_{filtered}(n) \exp(-j2\pi kn/N)$$

where the sum runs over all N frequency filtered signals (samples) in the range dimension.

The Fourier transformed frequency filtered signal may be further processed by the image generating unit 16. The image generating unit 16 may be particularly configured to generate α synthetic aperture radar image based on the Fourier transformed frequency filtered signal. For example, the synthetic aperture radar image may be based on or may correspond to an absolute value of the Fourier transformed frequency filtered signal.

The system 300 may include further components (not illustrated) for digital signal processing which are not discussed herein for the sake of simplicity. For example, the system 300 may include a further unit configured to perform a noise reduction of the Fourier transformed frequency filtered signal based on a threshold operation. Such noise reduction may e.g. be based on a constant false alarm rate detection scheme.

Figure 4:
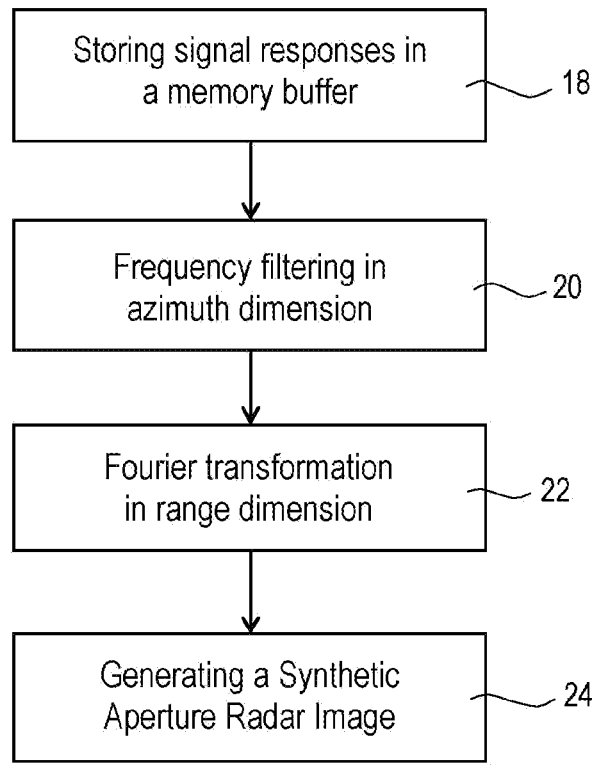
FIG. 4 illustrates a flowchart of a method for synthetic aperture radar signal processing. The method may be performed by the automotive embedded system 300 for synthetic aperture radar signal processing of FIG. 3.

FIG. 4 illustrates a flowchart of a method for synthetic aperture radar signal processing. For example, the method may be performed by the automotive embedded system 300 for synthetic aperture radar signal processing of FIG. 3. At 18, signal responses of a radar signal are stored in a memory buffer, wherein the stored signal responses are represented by a two-dimensional signal in an azimuth dimension and a range dimension. For example, the signal responses may be stored in the memory buffer 10 of FIG. 3. At 20, the two-dimensional signal is frequency filtered in the azimuth dimension. For example, the frequency filtering may be performed by the digital frequency filter 12 of FIG. 3. At 22, a Fourier transformation is applied to the frequency filtered signal in the range dimension. For example, the Fourier transformation may be applied by the Fourier unit 14 of FIG. 3. At 24, a synthetic aperture radar image is generated based on the Fourier transformed frequency filtered signal. For example, the synthetic aperture radar image may be generated by the image generating unit 16 of FIG. 3.

Figure 5:
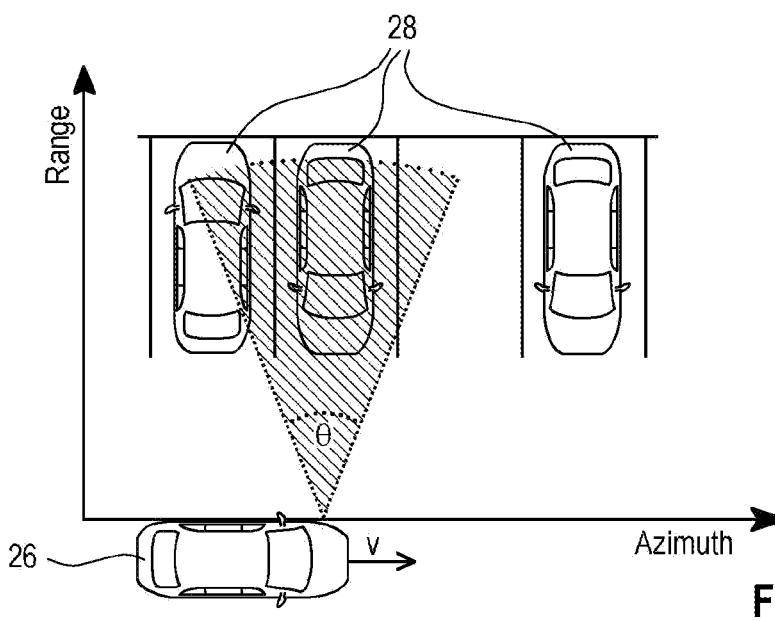
FIG. 5 schematically illustrates a parking lot detection scenario for a vehicle with a radar system arranged at a long side of the vehicle.

FIG. 5 schematically illustrates a parking lot detection scenario. A vehicle 26 may include a frequency modulated continuous wave synthetic aperture radar system arranged at a long side of the vehicle 26. The radar system may include an automotive embedded system for synthetic aperture radar signal processing as discussed in connection with FIGS. 3 and 4. The vehicle 26 may move with a constant velocity vector v in an azimuth direction and may transmit radar signals in a range direction perpendicular to the velocity vector v. As the vehicle 26 passes parked vehicles 28, the automotive embedded system may generate α synthetic aperture radar image of the illuminated scene. The generated synthetic aperture radar image may be used for detecting a free parking space located between two of the parked vehicles 28.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

REFERENCE NUMERAL LIST 2 radar system
4 target
6 antenna
8 transceiver circuitry
10 memory buffer
12 digital frequency filter
14 Fourier unit
16 image generating unit
26 vehicle
28 vehicle
300 automotive embedded system

What is claimed is:

1. A method for synthetic aperture radar signal processing, the method comprising:
    storing signal responses of a radar signal in a memory buffer, wherein the stored signal responses are represented by a two-dimensional signal in an azimuth dimension and a range dimension, wherein the two-dimensional signal has a curved range profile;
    frequency filtering the two-dimensional signal in the azimuth dimension to generate a frequency filtered signal, wherein the frequency filtered signal has a compensated range profile as a result of the curved range profile being refocused to a point via frequency filtering the two-dimensional signal in the azimuth dimension;
    applying a Fourier transformation to the frequency filtered signal in the range dimension to generate a Fourier transformed frequency filtered signal; and
    generating a synthetic aperture radar image based on the Fourier transformed frequency filtered signal,
    wherein generating the synthetic aperture radar image comprises:
        generating multiple partial synthetic aperture radar images, wherein each of the partial synthetic aperture radar images is based on 1% to 10% of all azimuth samples recorded for generating the synthetic aperture radar image; and
        generating the synthetic aperture radar image based on the multiple partial synthetic aperture radar images.

2. The method of claim 1, wherein the frequency filtering comprises attenuating Doppler frequencies lying outside of a frequency range, wherein the frequency range includes a predetermined Doppler frequency.

3. The method of claim 2, wherein the predetermined Doppler frequency is a Doppler frequency that corresponds to a closest approach in the range dimension between a radar system that transmits the radar signal and an observed target that reflects the radar signal as the signal responses of the radar signal.

4. The method of claim 1, wherein the frequency filtering comprises convolving the two-dimensional signal with a bandpass filter function in a time domain.

5. The method of claim 1, wherein the frequency filtering comprises multiplying the two-dimensional signal with a bandpass filter function in a frequency domain.

6. The method of claim 1, wherein the frequency filtering comprises:
    applying another Fourier transformation to the two-dimensional signal to transform the two-dimensional signal from a time domain into a frequency domain;
    cutting off Doppler frequencies of the Fourier transformed two-dimensional signal lying outside of a frequency range, wherein the frequency range includes a predetermined Doppler frequency to generate a frequency domain frequency filtered signal; and
    applying an inverse Fourier transformation from the frequency domain into the time domain to generate the frequency filtered signal.

7. The method of claim 1, wherein the frequency filtering comprises a range cell migration correction.

8. The method of claim 1, wherein the synthetic aperture radar image is based on an absolute value of the Fourier transformed frequency filtered signal.

9. The method of claim 1, further comprising:
    controlling a pulse repetition interval of the radar signal based on results of an acceleration measurement.

10. The method of claim 1, further comprising:
    correcting a scaling of the synthetic aperture radar image based on an acceleration profile.

11. The method of claim 1, wherein:
    the two-dimensional signal has the curved range profile of a point object, and
    frequency filtering the two-dimensional signal in the azimuth dimension refocuses the curved range profile to a point corresponding to the point object, the point being represented by the frequency filtered signal.

12. A method for synthetic aperture radar signal processing, the method comprising:
    storing signal responses of a radar signal in a memory buffer, wherein the stored signal responses are represented by a two-dimensional signal in an azimuth dimension and a range dimension;
    frequency filtering the two-dimensional signal in the azimuth dimension to generate a frequency filtered signal;
    applying a Fourier transformation to the frequency filtered signal in the range dimension to generate a Fourier transformed frequency filtered signal; and
    generating a synthetic aperture radar image based on the Fourier transformed frequency filtered signal,
    wherein generating the synthetic aperture radar image comprises:

generating multiple partial synthetic aperture radar images, wherein each of the partial synthetic aperture radar images is based on 1% to 10% of all azimuth samples recorded for generating the synthetic aperture radar image; and generating the synthetic aperture radar image based on the multiple partial synthetic aperture radar images.

13. An automotive embedded system for synthetic aperture radar signal processing, comprising:

a memory buffer configured to store signal responses of a radar signal, wherein the stored signal responses are represented by a two-dimensional signal in an azimuth dimension and a range dimension, wherein the two-dimensional signal has a curved range profile;

a digital frequency filter configured to filter the two-dimensional signal in the azimuth dimension to generate a frequency filtered signal, wherein the frequency filtered signal has a compensated range profile as a result of the curved range profile being refocused to a point via frequency filtering the two-dimensional signal in the azimuth dimension;

a processing circuit configured to apply a Fourier transformation to the frequency filtered signal in the range dimension to generate a Fourier transformed frequency filtered signal; and an image generator configured to process the Fourier transformed frequency filtered signal and generate a synthetic aperture radar image based on the Fourier transformed frequency filtered signal, wherein the image generator is configured to generate the synthetic aperture radar image by generating multiple partial synthetic aperture radar images, wherein each of the partial synthetic aperture radar images is based on 1% to 10% of all azimuth samples recorded for generating the synthetic aperture radar image, and generate the synthetic aperture radar image based on the multiple partial synthetic aperture radar images.

14. The automotive embedded system of claim 13, wherein:

the digital frequency filter is a bandpass filter configured to convolve the two-dimensional signal with a bandpass filter function in a time domain, or the digital frequency filter is a bandpass filter configured to multiply the two-dimensional signal with a bandpass filter function in the frequency domain.

15. The automotive embedded system of claim 13, wherein:

the digital frequency filter is a Butterworth filter, and/or the digital frequency filter is implemented in hardware.

16. The automotive embedded system of claim 13, wherein each of the digital frequency filter and the processing circuit are implemented as a field-programmable gate array (FPGA) or an application-specific integrated circuit (ASIC).

17. The automotive embedded system of claim 13, wherein the system is configured to operate in a 24 GHz, 77 GHz, or 79 GHz frequency band.

18. The automotive embedded system of claim 13, wherein the automotive embedded system is a parking assist system.

19. The automotive embedded system of claim 13, wherein the automotive embedded system is a frequency modulated continuous wave synthetic aperture radar system arranged at a long side of a vehicle.

20. A system, comprising:

an automotive embedded system for synthetic aperture radar signal processing, comprising:

a memory buffer configured to store signal responses of a radar signal, wherein the stored signal responses are represented by a two-dimensional signal in an azimuth dimension and a range dimension, wherein the two-dimensional signal has a curved range profile;

a digital frequency filter configured to filter the two-dimensional signal in the azimuth dimension to generate a frequency filtered signal, wherein the frequency filtered signal has a compensated range profile as a result of the curved range profile being refocused to a point via frequency filtering the two-dimensional signal in the azimuth dimension;

a processing circuit configured to apply a Fourier transformation to the frequency filtered signal in the range dimension to generate a Fourier transformed frequency filtered signal; and an image generator configured to process the Fourier transformed frequency filtered signal and generate a synthetic aperture radar image based on the Fourier transformed frequency filtered signal; and a sensor system configured to use the synthetic aperture radar image as an input, wherein the image generator is configured to generate the synthetic aperture radar image by generating multiple partial synthetic aperture radar images, wherein each of the partial synthetic aperture radar images is based on 1% to 10% of all azimuth samples recorded for generating the synthetic aperture radar image, and generate the synthetic aperture radar image based on the multiple partial synthetic aperture radar images.

* * * * *